(No Model.)
J. RYAN.
COUPLING FOR LUBRICATORS.
No. 358,074. Patented Feb. 22, 1887.
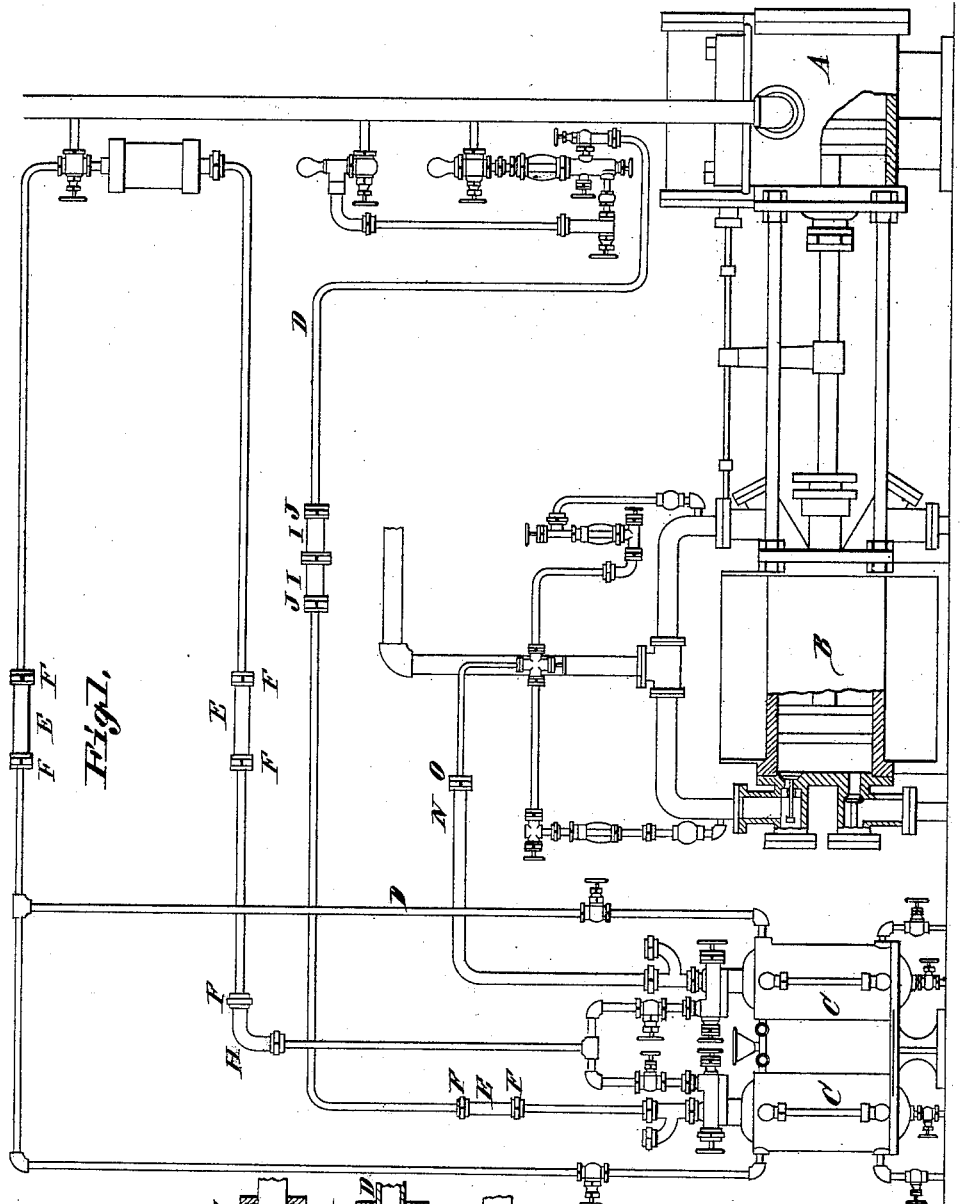
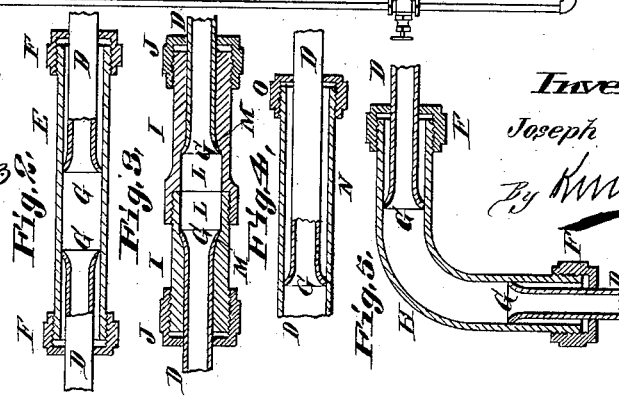
Attest:
Charles Pickles
F. A. Hopkins
Inventor,
Joseph Ryan
By Knight Bros
attys

UNITED STATES PATENT OFFICE.

JOSEPH RYAN, OF ST. LOUIS, MISSOURI.

COUPLING FOR LUBRICATORS.

SPECIFICATION forming part of Letters Patent No. 358,074, dated February 22, 1887.

Application filed April 3, 1886. Serial No. 197,704. (No model.)

*To all whom it may concern:*

Be it known that I, JOSEPH RYAN, of the city of St. Louis, in the State of Missouri, have invented a certain new and useful Improvement in Couplings for Lubricators, of which the following is a full, clear, and exact description, reference being had to the accompanying drawings, forming part of this specification, and in which—

Figure 1 is a side elevation illustrating a lubricating system with my improvement applied. Fig. 2 is an enlarged section of one form of coupling, showing the adjacent ends of the pipes, part in side view and part in section. Fig. 3 illustrates another form of coupling, shown in section. Fig. 4 illustrates another form, part in section and part in side view. Fig. 5 illustrates the same form as shown in Fig. 2 applied to an elbow or bend. These figures (2, 3, 4, and 5) are all enlarged.

My invention relates to an improved form of connecting-pipes in lubricating systems; and my invention consists in features of novelty, hereinafter fully described, and pointed out in the claim.

Referring to the drawings, A represents an engine, B a condenser, C oil-tanks, and D the connecting-pipes, of a lubricating system. These may be arranged in any desired way, and the parts in themselves form no feature of my invention, my invention relating to an improved method of connecting the pipes, whereby they may be put together quickly, and avoiding the necessity of adjusting the pipes to a nicety as to length, &c.

Referring to Fig. 2, the adjacent ends of the pipes D are shown as entering a sleeve or tube, E, which is also shown at E in Fig. 1. This sleeve or tube is provided at each end with a stuffing-box, F, through which the ends of the pipes D pass in entering the sleeve or tube. The inner ends of the pipes D are preferably flared, as shown at G, to prevent them from being pulled or withdrawn from the tube or sleeve. The stuffing-box forms a tight joint between the coupling and the pipes and prevents any leakage.

In Fig. 5 the same form of coupling is shown, except that the sleeve is bent into an elbow, as shown at H both in Fig. 5 and where its counterpart is found in Fig. 1.

In Fig. 3 the coupling is shown as consisting of two separate tubes or sleeves, (lettered I both in Fig. 3 and where this form of coupling is found in Fig. 1.) In this case the tubes are screwed together at their inner ends, and are provided at their outer ends with stuffing-boxes J, which form a liquid-tight joint between the sleeves and the pipes. The sleeves are formed with enlarged openings L at their inner ends, in which the flaring ends G of the pipes D fit, bearing against shoulders M, formed by the enlargements.

In Fig. 4 is shown another form of coupling, consisting in having one pipe larger to receive the end of the other or smaller pipe. This coupling is lettered N both in Fig. 4 and where it is found in Fig. 1. The end of the enlarged pipe is provided with a stuffing-box, O, and the end of the smaller pipe has a flared end, G, as in the other cases. This stuffing-box prevents leakage, as stated, and the flared end prevents the small pipe from being withdrawn from the larger one.

Various other modifications of this coupling might be shown, and might be made without departing from the essential features of my invention.

It will thus be seen that with this improved method of connecting the ends of pipes they may be made longer or shorter at will without requiring the use of any instrument or tool for the purpose of cutting off the pipe or forming the thread, which are often difficult to have on hand and to operate in putting up these systems, and all that is necessary to have in making a connection is to place the pipe together in the coupling, and have a wrench for tightening the caps of the stuffing-boxes.

With the ordinary method of coupling pipes it is necessary, of course, to cut off the pipe to get it just the required length and then form a thread to receive the coupling. This is not necessary with my improved method, and the pipes, even if not long enough to meet, can be connected without inconvenience, and require no extra labor.

I claim as my invention—

The combination, with a lubricator and the part to be lubricated, of a pipe, D, having a flaring end, G, a sleeve, E, in which said flaring end fits snugly, as shown, and the stuffing-box secured to the sleeve and surrounding the tube, substantially as and for the purpose set forth.

JOSEPH RYAN.

In presence of—
 GEO. H. KNIGHT,
 EDW. S. KNIGHT.